US011119240B2

(12) United States Patent
Milford et al.

(10) Patent No.: US 11,119,240 B2
(45) Date of Patent: Sep. 14, 2021

(54) CASED-WELL TO CASED-WELL ACTIVE MAGNETIC RANGING

(71) Applicant: Halliburton Energy Services, Inc., Houston, TX (US)

(72) Inventors: Tyler Russel Milford, Okotoks (CA); Ryan David Zallas, Sherwood Park (CA); Alan James Gosse, Sherwood Park (CA)

(73) Assignee: Halliburton Energy Services, Inc., Houston, TX (US)

( * ) Notice: Subject to any disclaimer, the term of this patent is extended or adjusted under 35 U.S.C. 154(b) by 7 days.

(21) Appl. No.: 15/772,464

(22) PCT Filed: Jun. 1, 2017

(86) PCT No.: PCT/US2017/035507
§ 371 (c)(1),
(2) Date: Apr. 30, 2018

(87) PCT Pub. No.: WO2018/222199
PCT Pub. Date: Dec. 6, 2018

(65) Prior Publication Data
US 2020/0271815 A1 Aug. 27, 2020

(51) Int. Cl.
*G01V 3/26* (2006.01)
*E21B 47/13* (2012.01)
(Continued)

(52) U.S. Cl.
CPC ............ *G01V 3/26* (2013.01); *E21B 47/0228* (2020.05); *E21B 47/13* (2020.05); *E21B 43/2406* (2013.01)

(58) Field of Classification Search
CPC ....... G01V 3/26; E21B 47/13; E21B 47/0228; E21B 43/2406
See application file for complete search history.

(56) References Cited

U.S. PATENT DOCUMENTS

| 3,186,223 A | 6/1965 | Wilson |
| 6,581,718 B1 | 6/2003 | Vigren et al. |

(Continued)

FOREIGN PATENT DOCUMENTS

WO 2010147699 12/2010

OTHER PUBLICATIONS

International Search Report and Written Opinion for Application No. PCT/US2017/035507 dated Feb. 27, 2018.

*Primary Examiner* — Clayton E. LaBalle
*Assistant Examiner* — Michael A Harrison
(74) *Attorney, Agent, or Firm* — Benjamin Ford; C. Tumey Law Group PLLC

(57) ABSTRACT

A method and system for ranging between two cased wellbores. A method may comprise disposing a first downhole tool on a first conveyance line in a first cased wellbore, disposing a second downhole tool on a second conveyance line in a second cased wellbore, broadcasting an electromagnetic field from the transmitter, recording the electromagnetic field with the receiver, transmitting the recording to an information handling system, and calculating relative position between the first cased wellbore and the second cased wellbore with the information handling system. An electromagnetic ranging system for ranging between two cased wellbores may comprise a first downhole tool, a first conveyance line, a second downhole tool, a second conveyance line, and an information handling system configured for exciting the transmitter.

20 Claims, 3 Drawing Sheets

(51) Int. Cl.
*E21B 47/0228* (2012.01)
*E21B 43/24* (2006.01)

(56) References Cited

U.S. PATENT DOCUMENTS

| | | |
|---|---|---|
| 8,912,915 B2 | 12/2014 | Hay et al. |
| 9,625,605 B2 | 4/2017 | San Martin et al. |
| 9,752,426 B2 | 9/2017 | Wu |
| 9,874,085 B2 | 1/2018 | Wu et al. |
| 9,879,521 B2 | 1/2018 | Wu et al. |
| 9,903,195 B2 | 2/2018 | Wu et al. |
| 9,920,616 B2 | 3/2018 | Hay |
| 9,951,604 B2 | 4/2018 | Hay |
| 2004/0239329 A1 | 12/2004 | Haber et al. |
| 2010/0044035 A1 | 2/2010 | Bespalov |
| 2014/0311758 A1 | 10/2014 | Varkey et al. |
| 2016/0258277 A1* | 9/2016 | Bittar .................. E21B 47/0232 |
| 2018/0038219 A1 | 2/2018 | Ahmadi Kalateh Ahmad |
| 2018/0045034 A1 | 2/2018 | Wu et al. |

* cited by examiner

CASED-WELL TO CASED-WELL ACTIVE MAGNETIC RANGING

BACKGROUND

Wellbores drilled into subterranean formations may enable recovery of desirable fluids (e.g., hydrocarbons) using a number of different techniques. Knowing the location and orientation of a cased wellbore may be important in a field of multiple cased wellbores. For example, in the case of a blow out, a cased wellbore may need to be intersected precisely from a second cased (or relief) wellbore in order to stop the blow out. Another application may be where a second cased wellbore may be extended to be drilled parallel to a first cased wellbore, for example, in a steam-assisted gravity drainage ("SAGD") operation, wherein the second cased wellbore may be an injection wellbore while the first cased wellbore may be a production wellbore. Yet another application may be where knowledge of multiple cased wellbores location and orientation may be needed to avoid collision during drilling from a second cased wellbore.

BRIEF DESCRIPTION OF THE DRAWINGS

These drawings illustrate certain aspects of some examples of the present disclosure, and should not be used to limit or define the disclosure.

DETAILED DESCRIPTION

Figure 1:
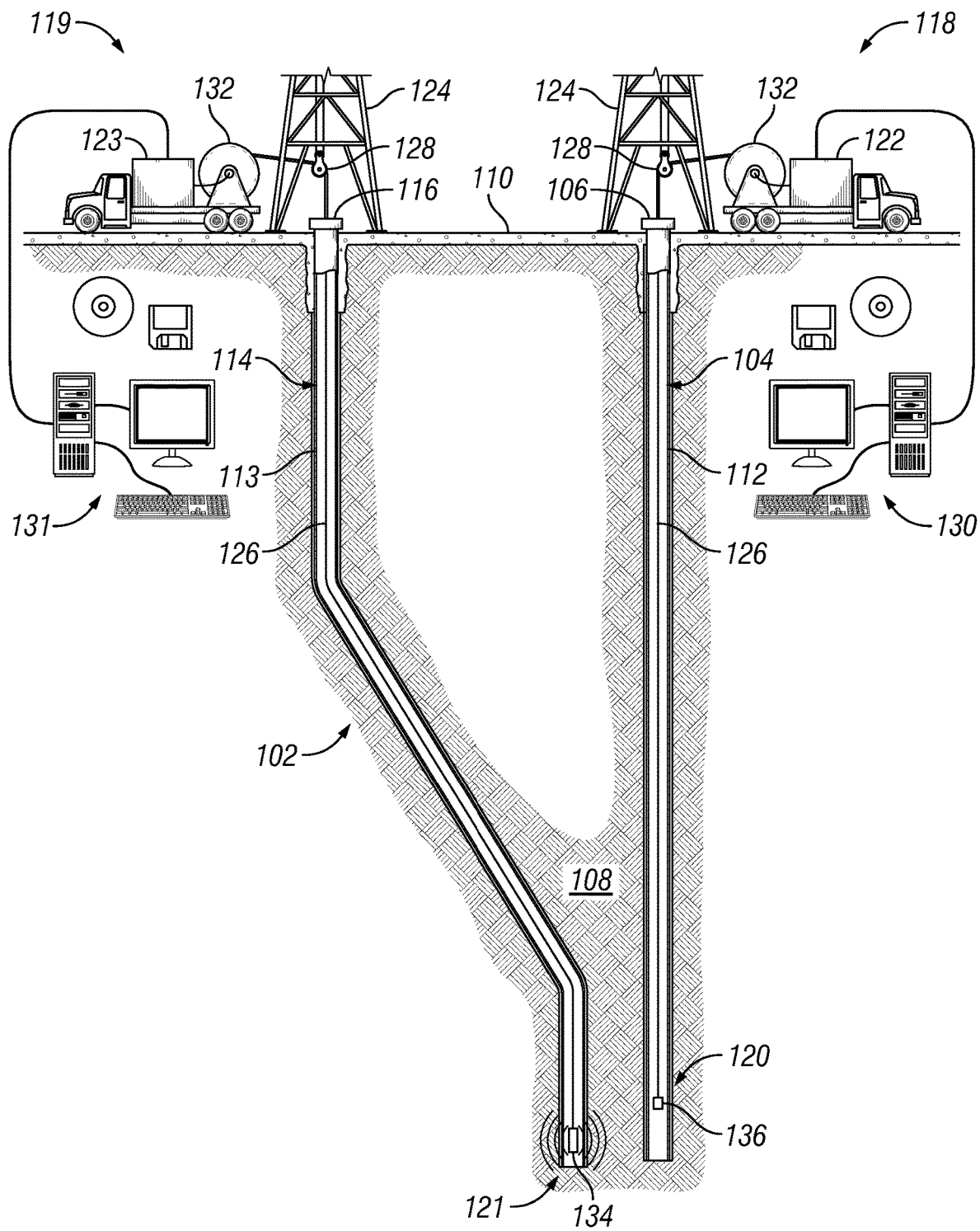
FIG. 1 is a schematic illustration of an example electromagnetic ranging system in a wellbore.

This disclosure may generally relate to electromagnetic ranging methods for determining relative position between multiple cased wellbores. More specifically, it may describe systems and methods that comprise transmitters and receivers to relative position (e.g., distance, orientation) between two or more cased wellbores.

An electromagnetic ranging system may be employed in subterranean operations to determine direction and distance between two cased wellbores. Electromagnetic ranging systems may use different techniques to obtain location and orientation between a first cased wellbore and second cased wellbore. Additional electromagnetic ranging methods may energize a target well by a current source on the surface and measure the electromagnetic field produced by the target well on a logging and/or drilling device in the second wellbore, which may be disposed on a bottom hole assembly. Methods in which energizing may occur from the first wellbore may be used but may be limited due to current transmitter and receiver configurations Systems and methods of the present disclosure may be implemented, at least in part, with an information handling system. An information handling system may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates an electromagnetic ranging system 102. As illustrated, a first cased wellbore 104 may extend from a first wellhead 106 into a subterranean formation 108 from a surface 110. Generally, first cased wellbore 104 may include horizontal, vertical, slanted, curved, and other types of wellbore geometries and orientations. First cased wellbore 104 may comprise a conductive member. A first conductive member 112 may be disposed within first cased wellbore 104 and may comprise a metallic material that may be conductive and magnetic. By way of example, first conductive member 112 may be a casing, liner, tubing, or other elongated steel tubular disposed in first cased wellbore 104. Determining the position and direction of first cased wellbore 104 accurately and efficiently may be required in a variety of applications. For example, to avoid collision with first cased wellbore 104 in drilling operations that may extend second cased wellbore 114, which may have been previously completed. As will be discussed in more detail, electromagnetic ranging system 102 may be used for determining the relative position between first cased wellbore 104 and second cased wellbore 114. For example, the electromagnetic ranging system 102 may be used for determining the distance and/or orientation between the first cased wellbore 104 and the second cased wellbore 114.

With continued reference to FIG. 1, second cased wellbore 114 may extend from a second wellhead 116 that extends into subterranean formation 108 from surface 110. Generally, second cased wellbore 114 may include horizontal, vertical, slanted, curved, and other types of wellbore geometries and orientations. Additionally, while first cased wellbore 104 and second case wellbore 114 are illustrated as being land-based, it should be understood that the present techniques may also be applicable in offshore applications. Second cased wellbore 114 may comprise second conductive member 113. By way of example, second conductive member 113 may be a casing, liner, tubing, or other elongated steel tubular disposed in first cased wellbore 104. It should also be noted that first cased wellbore 104 and second cased wellbore 114 may originate from the same wellhead instead of the first wellhead 106 and second wellhead 116 as shown on FIG. 1.

A first tool conveyance system 118 and a second tool conveyance system 119 may be utilized in conjunction to determine the range, location, and orientation between first cased wellbore 104 and second cased wellbore 114. First tool conveyance system 118 may comprise a first downhole tool 120 attached to a first vehicle 122. It should be noted that first downhole tool 120 may not be attached to first vehicle 122. Second tool conveyance system 119 may comprise a second downhole tool 121 attached to a second vehicle 123. It should be noted that second downhole tool 121 may not be attached to second vehicle 123.

First downhole tool 120 and second downhole tool 121 may be supported by derrick 124 at surface 110. First downhole tool 120 may be tethered to first vehicle 122 through first conveyance line 126 and second downhole tool 121 may be tethered to second vehicle 123 through second conveyance line 127. First conveyance line 126 may be disposed around one or more sheave wheels 128 to second vehicle 122. Derrick 124 includes a load cell (not shown) which determines the amount of pull on first conveyance line 126 at surface 110. A first information handling system 130 and a second information handling system 131 may control a safety valve (not illustrated) which controls the hydraulic pressure that drives drum 132 on first vehicle 122 and/or second vehicle 123, respectively, which may reel up and/or release first conveyance line 126 which may move first downhole tool 120 and/or second conveyance line 127 which may move second downhole tool 121 up and/or down. The safety valve may be adjusted to a pressure such that sheave wheel 128 may only impart a small amount of tension to first conveyance line 126 and/or over and above the tension necessary to retrieve first conveyance line 126 and/or first downhole tool 120. This safety valve may act similarly with second conveyance line 127 and second downhole tool 121. The safety valve is typically set a few hundred pounds above the amount of desired safe pull on first conveyance line 126 and/or second conveyance line 127 such that once that limit is exceeded, further pull on first conveyance line 126 and/or second conveyance line 127 may be prevented.

First conveyance line 126 and second conveyance line 127 may each individually be a wireline, slickline, coiled tubing, pipe, or the like, which may provide mechanical suspension as well as electrical conductivity for first downhole tool 120 and/or second downhole tool 121. Where it may provide electrical conducting, first conveyance line 126 and/or second conveyance line 127 may comprise an inner core of a plurality of electrical conductors covered by an insulating wrap. An inner and outer steel armor sheath may be disposed around the conductors. The electrical conductors may be used for communicating power and telemetry between first vehicle 122 and/or second vehicle 123 (or other equipment) and first downhole tool 120 and/or second downhole tool 121. First downhole tool 120 may comprise a receiver 134 and/or may comprise a transmitter 136. As illustrated in FIG. 1, first tool conveyance system 118 may be operated within first cased wellbore 104 and second tool conveyance system 119 may operate within second cased wellbore 114. Second downhole tool 121 in second cased wellbore 114, second tool conveyance system 119, may comprise a transmitter 136 and/or a receiver 134.

It should be noted that both first downhole tool 120 and/or second downhole tool 121 may comprise a plurality of transmitters 134 or a plurality of receivers 136. Transmitter 134 and receiver 136 may work together to determine the range between first cased wellbore 104 and second cased wellbore 114. Transmitters 134 and receivers 136 may be disposed along a longitudinal axis of first downhole tool 120 and/or second downhole tool 121. Transmitter 136 may be an electromagnetic type transmitter which may include a magnetic source, such as a magnet assembly (containing permanent and/or electro-magnets), capable of producing and broadcasting an electromagnetic field. Receiver 136 may be able to record the broadcasted electromagnetic field from transmitter 134. Additionally, transmitter 134 and receiver 136 may be of an induction type. Transmitters 134 may include coil antenna and solenoids. As disclosed, the concepts that are described herein are valid for any type of receivers 136, including, without limitation, wire antenna, toroidal antenna and/or azimuthal button electrodes, and/or coil antenna. In order to achieve the orientation that is needed for any coil antenna, a bi-axial or tri-axial configuration may be used. Additionally, a combination of multiple transmitter 134/receivers 136 may be used to generate an antenna that may effectively be directed at the desired direction. Transmitter 134 and receiver 136 may be operated in real-time, including downhole processing for a range and direction between first cased wellbore 104 and second cased wellbore 114, which may allow integration with survey data. First information handling system 130 of first tool conveyance system 118 may operate transmitter 134 and receiver 136 on first downhole tool 120 and second information handling system 131 of second tool conveyance system 119 may operate transmitter 134 and receiver 136 on second downhole tool 121.

Distance and direction measurements may allow an operator to determine the relative location between first cased wellbore 104 and second cased wellbore 114. An operator may dispose a first downhole tool 120 on a first conveyance line 126 into a first cased wellbore 104. First downhole tool 120 may comprise a transmitter 134 and/or a receiver 136. The operator may further disposed a second downhole tool 121 on a second conveyance line 127 in a second cased wellbore 114. Second downhole tool 121 may comprise a receiver 136 or a transmitter 134. Transmitter 134 may be excited with current from a power source (not illustrated) from surface 110 and/or by a power source disposed on first downhole tool 120 and/or second downhole tool 121. Transmitter 134 may broadcast an electromagnetic field into formation 108. The electromagnetic field may be recorded by receiver 136 in a separate cased wellbore. The recorded electromagnetic field may be transmitted to first information handling system 130 and/or second information handling system 131 along conveyance line 126. The recorded electromagnetic field may be analyzed to determine the location and/or orientation of first cased wellbore 104 relative to second cased wellbore 114.

Figure 2:
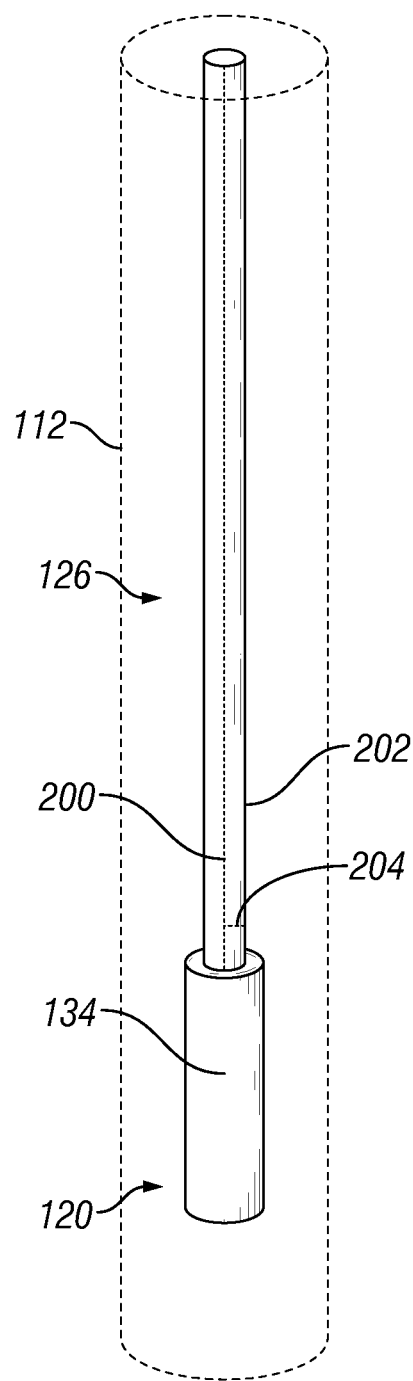
FIG. 2 is a schematic illustration of an example transmitter on a conveyance line.

FIG. 2 illustrates transmitter 134 disposed on first downhole tool 120 within first conductive member 112. It should be noted that transmitter 134 may be disposed on second downhole tool 121 (Referring to FIG. 1) within second conductive member 113 (Referring to FIG. 1). Transmitter 134 may be attached to first conveyance line 126, which may attach transmitter 134 to first information handling system 130, referring to FIG. 1. In FIG. 2, first conveyance line 126 may comprise electronic wire 200 and outer armor 202. Outer armor 202 may protected electronic wire 200 from downhole elements. Electronic wire 200 may allow for the movement of power, information, and/or the like between transmitter 134 and first information handling system 130. When producing an electromagnetic field, current may flow through electronic wire 200 from surface 110, referring to FIG. 1, to transmitter 134. At about transmitter 134 current may flow through short 204 to outer armor 202. The path flow of the current may ensure that the electromagnetic field being generated may be localized to the wellbore that transmitter 124 may be disposed, which may be used in formations 108 that may comprise large numbers of wellbores. Moving through short 204 to outer armor 202, current may traverse outer armor 202 to surface 110. Additionally, current may ground to conductive member 112 and to formation 108. The current may move freely up, down, and/or dissipated within first conductive member 112 and/or formation 108. Current movement from electronic wire 200 into formation 108 and to surface 110 may allow for the production and broadcasting of an electromagnetic field by transmitter 134.

Figure 3:
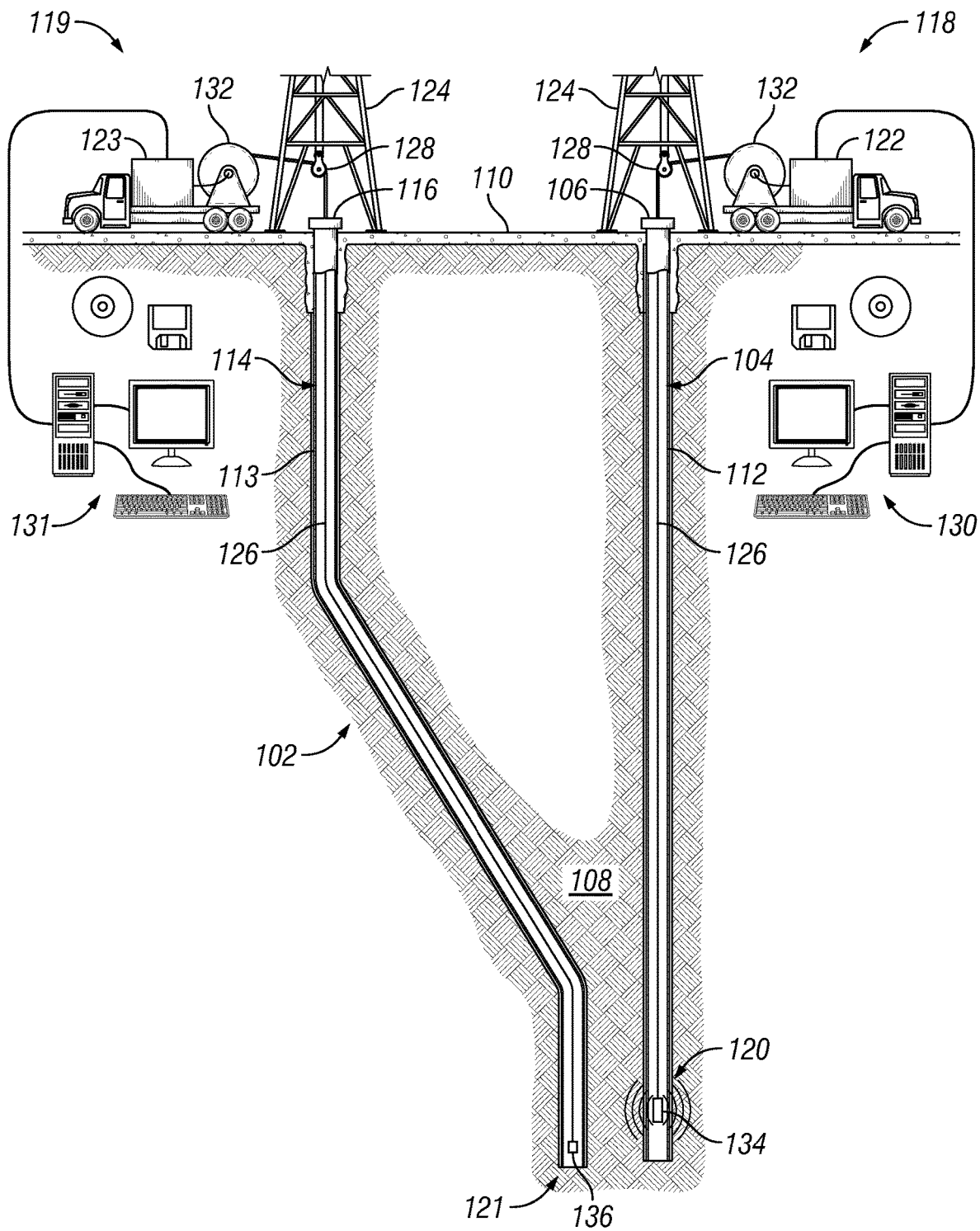
FIG. 3 is a schematic illustration of another example electromagnetic ranging system.

FIG. 3 illustrates another electromagnetic ranging system 102 in which first tool conveyance system 118 may comprise first downhole hole tool 120 comprising transmitter 134 and second conveyance linetool conveyance system 119, may comprise second downhole tool 121 comprising a receiver 136. As illustrated in FIG. 3, a first cased wellbore 104 may extend from a first wellhead 106 into a subterranean formation 108 from a surface 110. Generally, first cased wellbore 104 may include horizontal, vertical, slanted, curved, and other types of wellbore geometries and orientations. First cased wellbore 104 may comprise a conductive member. A first conductive member 112 may be disposed within first cased wellbore 104 and may comprise a metallic material that may be conductive and magnetic. By way of example, first conductive member 112 may be a casing, liner, tubing, or other elongated steel tubular disposed in first cased wellbore 104. Determining the position and direction of first cased wellbore 104 accurately and efficiently may be required in a variety of applications. For example, to avoid collision with first cased wellbore 104 in drilling operations that may extend second cased wellbore 114, which may have been previously completed. As will be discussed in more detail, electromagnetic ranging system 102 may be used for determining the location of first cased wellbore 104 with respect to second cased wellbore 114.

With continued reference to FIG. 3, second cased wellbore 114 may also extend from a second wellhead 116 that extends into subterranean formation 108 from surface 110. Generally, second cased wellbore 114 may include horizontal, vertical, slanted, curved, and other types of wellbore geometries and orientations. Additionally, while first cased wellbore 104 and second case wellbore 114 are illustrated as being land-based, it should be understood that the present techniques may also be applicable in offshore applications. Second cased wellbore 114 may comprise second conductive member 113. It should also be noted that first cased wellbore 104 and second cased wellbore 114 may originate from the same wellhead.

This method and system may include any of the various features of the compositions, methods, and system disclosed herein, including one or more of the following statements.

Statement 1: A method for ranging between two cased wellbores, comprising: disposing a first downhole tool on a first conveyance wire in a first cased wellbore, wherein the first downhole tool comprises a transmitter; disposing a second downhole tool on a second conveyance wire in a second cased wellbore, wherein the second downhole tool comprises a receiver; broadcasting an electromagnetic field from the transmitter; recording the electromagnetic field with the receiver; transmitting the recording to an information handling system; and calculating relative position between the first cased wellbore and the second cased wellbore with the information handling system.

Statement 2: The method of statement 1, comprising drilling out the first cased wellbore.

Statement 3: The method of statement 2 or statement 1, comprising drilling out the second cased wellbore.

Statement 4: The method of any preceding statement, wherein the transmitter is a wire antenna, toroidal antenna, azimuthal button electrodes, coil antenna, induction based, or electromagnetic based.

Statement 5: The method of any preceding statement, wherein the receiver is a coil antenna or induction based.

Statement 6: The method of any preceding statement, wherein the first conveyance line comprises an internal wire and an outer armor.

Statement 7: The method of any preceding statement, shorting the internal wire to the outer armor at the transmitter and pushing a current from the internal wire to the outer armor.

Statement 8: The method of any preceding statement, comprising calculating a distance from a surface to the transmitter based on intensity of the current in the internal wire and the outer armor.

Statement 9: An electromagnetic ranging system for ranging between two cased wellbores, comprising: a first downhole tool, wherein the first downhole tool comprises a transmitter; a first conveyance line, wherein the first downhole tool is disposed on the first conveyance line, wherein the first conveyance line is disposed in a first cased wellbore; a second downhole tool, wherein the second downhole tool comprises a receiver; a second conveyance line, wherein the second downhole tool is disposed on the second conveyance line, wherein the second conveyance line in a second cased wellbore; and an information handling system configured for exciting the transmitter to broadcast an electromagnetic field, wherein the information handling system is further configured for recording the electromagnetic field with the receiver and determining relative position between the first cased wellbore relative and the second cased wellbore.

Statement 10: The electromagnetic ranging system of statement 9, wherein the transmitter is a coil antenna, induction based, or electromagnetic based.

Statement 11: The electromagnetic ranging system of statement 10 or statement 9, wherein the receiver is a wire antenna, toroidal antenna, azimuthal button electrodes, coil antenna, induction based, or electromagnetic based.

Statement 12: The electromagnetic ranging system of any one of statements 9-11, wherein the first conveyance line comprises an internal wire and an outer armor.

Statement 13: The electromagnetic ranging system of any of statements 9-12, wherein the first conveyance line comprises a short from the internal wire to the outer armor to push a current from the internal wire to the outer armor.

Statement 14: The electromagnetic ranging system of any one of statements 9-13, wherein the information handling system is further configured o calculate a distance from a surface to the transmitter based on intensity of the current in the internal wire and the outer armor.

Statement 15: A method for ranging between two cased wellbores, comprising: disposing a first downhole tool on a first conveyance line in a first cased wellbore, wherein the first downhole tool comprises a transmitter; disposing a second downhole tool on a second conveyance line in a second cased wellbore, wherein the second downhole tool comprises a receiver; exciting the transmitter; broadcasting an electromagnetic field from the transmitter; recording the electromagnetic field with the receiver; transmitting the recording to an information handling system; calculating the distance and orientation of the first cased wellbore with respect to the second cased wellbore with the information handling system; and drilling out the second cased wellbore.

Statement 16: The method of statement 15, wherein the transmitter is a coil antenna, induction based, or electromagnetic based.

Statement 17: The method of statement 16 or statement 15, wherein the receiver is a wire antenna, toroidal antenna, azimuthal button electrodes, coil antenna, induction based, or electromagnetic based.

Statement 18: The method of any one of statements 15-17, wherein the first conveyance line comprises an internal wire and an outer armor.

Statement 19: The method of any one of statements 15-18, shorting the internal wire to the outer armor at the transmitter and pushing a current form the internal wire to the outer armor.

Statement 20: The method of any one of statements 15-19, calculating a distance from a surface to the transmitter based on intensity of the current in the internal wire and the outer armor.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for ranging between two cased wellbores, comprising:
    disposing a first downhole tool on a first conveyance line in a first cased wellbore, wherein the first downhole tool comprises a transmitter and the conveyance line comprises an internal wire and an outer armor;
    disposing a second downhole tool on a second conveyance line in a second cased wellbore, wherein the second downhole tool comprises a receiver;
    broadcasting an electromagnetic field from the transmitter;
    shorting the internal wire to the outer armor at the transmitter and pushing a current from the internal wire to the outer armor;
    recording the electromagnetic field with the receiver;
    sending the recording to an information handling system; and
    calculating a relative position between the first cased wellbore and the second cased wellbore with the information handling system.

2. The method of claim 1, comprising drilling out the first cased wellbore.

3. The method of claim 1, comprising drilling out the second cased wellbore.

4. The method of claim 1, wherein the transmitter is a wire antenna, toroidal antenna, azimuthal button electrodes, coil antenna, induction based, or electromagnetic based.

5. The method of claim 1, wherein the receiver is a coil antenna or induction based.

6. The method of claim 1, comprising calculating a distance from a surface to the transmitter based on intensity of the current in the internal wire and the outer armor.

7. The method of claim 1, wherein the outer armor protects the internal wire from downhole elements.

8. An electromagnetic ranging system for ranging between two cased wellbores, comprising:
    a first downhole tool, wherein the first downhole tool comprises a transmitter;
    a first conveyance line, wherein the first downhole tool is disposed on the first conveyance line, wherein the first conveyance line is disposed in a first cased wellbore and comprises an internal wire and an outer armor in which a short from the internal wire to the outer armor pushes a current from the internal wire to the outer armor;
    a second downhole tool, wherein the second downhole tool comprises a receiver;
    a second conveyance line, wherein the second downhole tool is disposed on the second conveyance line, wherein the second conveyance line in a second cased wellbore; and
    an information handling system configured to excite the transmitter to broadcast an electromagnetic field; record the electromagnetic field with the receiver;

determine relative position between the first cased wellbore and the second cased wellbore.

9. The electromagnetic ranging system of claim 8, wherein the transmitter is a coil antenna, induction based, or electromagnetic based.

10. The electromagnetic ranging system of claim 8, wherein the receiver is a wire antenna, toroidal antenna, azimuthal button electrodes, coil antenna, induction based, or electromagnetic based.

11. The electromagnetic ranging system of claim 8, wherein the information handing system is further configured to calculate a distance from a surface to the transmitter based on intensity of the current in the internal wire and the outer armor.

12. The electromagnetic ranging system of claim 8, wherein the outer armor protects the internal wire from downhole elements.

13. A method for ranging between two cased wellbores, comprising:
    disposing a first downhole tool on a first conveyance line in a first cased wellbore, wherein the first downhole tool comprises a transmitter and the first conveyance line comprises an internal wire and an outer armor;
    disposing a second downhole tool on a second conveyance line in a second cased wellbore, wherein the second downhole tool comprises a receiver;
    exciting the transmitter;
    broadcasting an electromagnetic field from the transmitter;
    shorting the internal wire to the outer armor at the transmitter and pushing a current form the internal wire to the outer armor;
    recording the electromagnetic field with the receiver;
    sending the recording to an information handling system;
    calculating the location or orientation of a first cased wellbore with respect to the second cased wellbore with the information handling system; and
    drilling out the second cased wellbore.

14. The method of claim 13, wherein the transmitter is a coil antenna, induction based, or electromagnetic based.

15. The method of claim 13, wherein the receiver is a wire antenna, toroidal antenna, azimuthal button electrodes, coil antenna, induction based, or electromagnetic based.

16. The method of claim 13, calculating a distance from a surface to the transmitter based on intensity of the current in the internal wire and the outer armor.

17. The method of claim 13, wherein the outer armor protects the internal wire from downhole elements.

18. A method for ranging between two cased wellbores, comprising:
    disposing a first downhole tool on a first conveyance line in a first cased wellbore, wherein the first downhole tool comprises a transmitter and the conveyance line comprises an internal wire and an outer armor;
    disposing a second downhole tool on a second conveyance line in a second cased wellbore, wherein the second downhole tool comprises a receiver;
    broadcasting an electromagnetic field from the transmitter;
    shorting the internal wire to the outer armor at the transmitter and pushing a current from the internal wire to the outer armor;
    recording the electromagnetic field with the receiver;
    sending the recording to an information handling system;
    calculating a relative position between the first cased wellbore with respect to the second cased wellbore; and
    calculating a distance from a surface to the transmitter based on intensity of the current in the internal wire and the outer armor with the information handling system.

19. An electromagnetic ranging system for ranging between two cased wellbores, comprising:
    a first downhole tool, wherein the first downhole tool comprises a transmitter;
    a first conveyance line, wherein the first downhole tool is disposed on the first conveyance line, wherein the first conveyance line is disposed in a first cased wellbore and comprises an internal wire and an outer armor in which a short from the internal wire to the outer armor pushes a current from the internal wire to the outer armor;
    a second downhole tool, wherein the second downhole tool comprises a receiver;
    a second conveyance line, wherein the second downhole tool is disposed on the second conveyance line, wherein the second conveyance line in a second cased wellbore; and
    an information handling system configured to:
        excite the transmitter to broadcast an electromagnetic field;
        record the electromagnetic field with the receiver;
        determine a relative position between the first cased wellbore and the second cased wellbore; and
        calculate a distance from a surface to the transmitter based on intensity of the current in the internal wire and the outer armor.

20. A method for ranging between two cased wellbores, comprising:
    disposing a first downhole tool on a first conveyance line in a first cased wellbore, wherein the first downhole tool comprises a transmitter and the first conveyance line comprises an internal wire and an outer armor;
    disposing a second downhole tool on a second conveyance line in a second cased wellbore, wherein the second downhole tool comprises a receiver;
    exciting the transmitter;
    broadcasting an electromagnetic field from the transmitter;
    shorting the internal wire to the outer armor at the transmitter and pushing a current form the internal wire to the outer armor;
    recording the electromagnetic field with the receiver;
    sending the recording to an information handling system;
    calculating a location or orientation of the first cased wellbore with respect to the second cased wellbore;
    calculating a distance from a surface to the transmitter based on intensity of the current in the internal wire and the outer armor with the information handling system; and
    drilling out the second cased wellbore.

* * * * *